(12) United States Patent
Morikuni et al.

(10) Patent No.: US 7,821,955 B2
(45) Date of Patent: Oct. 26, 2010

(54) UNIVERSAL PLUG-AND-PLAY LATENCY AND DELAY COMPENSATION

(75) Inventors: James J. Morikuni, Itasca, IL (US); Lars S. Sorensen, Algonqin, IL (US)

(73) Assignee: Motorola, Inc., Schaumburg, IL (US)

( * ) Notice: Subject to any disclaimer, the term of this patent is extended or adjusted under 35 U.S.C. 154(b) by 893 days.

(21) Appl. No.: 11/647,503

(22) Filed: Dec. 28, 2006

(65) Prior Publication Data

US 2008/0159162 A1 Jul. 3, 2008

(51) Int. Cl.
*H04J 3/14* (2006.01)
*H04L 12/28* (2006.01)

(52) U.S. Cl. ..................... 370/252; 370/254

(58) Field of Classification Search ............... 370/241, 370/252, 254
See application file for complete search history.

(56) References Cited

U.S. PATENT DOCUMENTS

2006/0002320 A1  1/2006  Costa-Requena et al.
2008/0019367 A1*  1/2008  Ito et al. .................... 370/392

FOREIGN PATENT DOCUMENTS

EP         04105828.0      11/2004

WO  PCT/IB2005/053726    11/2005

OTHER PUBLICATIONS

Mills et al., "Adaptive Jitter Control for UPnP M-Search," Information Technology Laboratory, National Institute of Standards and Technology, Gaithersburg, MD 20899 (2003).
"Ping," Wikipedia.org, retrieved Aug. 9, 2010, from http://web.archive.org/web/20061203014315/http://en.wikipedia.org/wiki/Ping (1 page).
"UPnP™ Device Architecture 1.0," Version 1.0.1, Dec. 2, 2003 (76 pages).
Roe, Bryan, et al., "Remote Access using Application Gateway," Intel Proposal, presented at a Mar. 27, 2006, UPnP Remote Access Working Committee standards meeting (6 pages).
Samsung, "Remote Access Architecture Proposal," Mar. 7, 2006 (12 pages).

* cited by examiner

*Primary Examiner*—Kevin C Harper
(74) *Attorney, Agent, or Firm*—Nathan O. Greene; Brinks Hofer Gilson & Lione

(57) ABSTRACT

A Universal Plug-and-Play (UPnP) device (200) determines a latency and propagation delay period (LPDP) that is added to a UPnP network (100) response time, based on UPnP network (100) conditions. The UPnP device (200) transmits a search command when connecting to the UPnP network (100), and waits a period of time based on the LPDP for a response to the search command from other UPnP devices (113) in the UPnP network (100) before the UPnP device (200) stops listening for other UPnP devices (113).

22 Claims, 6 Drawing Sheets

UNIVERSAL PLUG-AND-PLAY LATENCY AND DELAY COMPENSATION

BACKGROUND

The invention relates to Universal Plug-and-Play (UPnP) networks. In particular, the invention relates to latency and delay compensation in UPnP networks.

Universal Plug-and-Play (UPnP) is a set of computer network protocols promulgated by the UPnP Forum. The goals of UPnP are to allow devices to connect seamlessly and to simplify the implementation of networks in the home (data sharing, communications, and entertainment) and corporate environments. UPnP achieves this by defining and publishing UPnP device control protocols built upon open, Internet-based communication standards.

The UPnP standard was defined for device discovery over local area networks. Latency was not explicitly accounted for under the assumption that it would be nearly negligible in LANs.

When a UPnP control point is powered on, one of the first things it does is to multicast a search command to discover other UPnP devices on the network. Recipients of this command are to respond within an amount of time specified by a parameter embedded in the command. The UPnP standard states that: "The control point should wait at least the amount of time specified in the header for responses to arrive from devices. The wait for responses should be extended by additional time (a second or two) to allow for network propagation and processing delays." The standard does not specify what this "additional time" should be other than suggesting that it be "a second or two."

The UPnP standard is also now being extended to consider device discovery over the wide area network; for example, through a UPnP tunnel in the WAN between a cell phone a home gateway. Clearly, latency is non-negligible over the WAN. The UPnP standards body is currently working to address latency through the use of a proxy element in the home that acts on behalf of the remote mobile device. UPnP proxy elements are known in the art, but the implementation of these proxy elements may be complex and not applicable in all systems.

DESCRIPTION OF THE DRAWINGS

Embodiments of the present invention are now described, by way of only, with reference to the accompanying figures in which.

DETAILED DESCRIPTION

Figure 1:
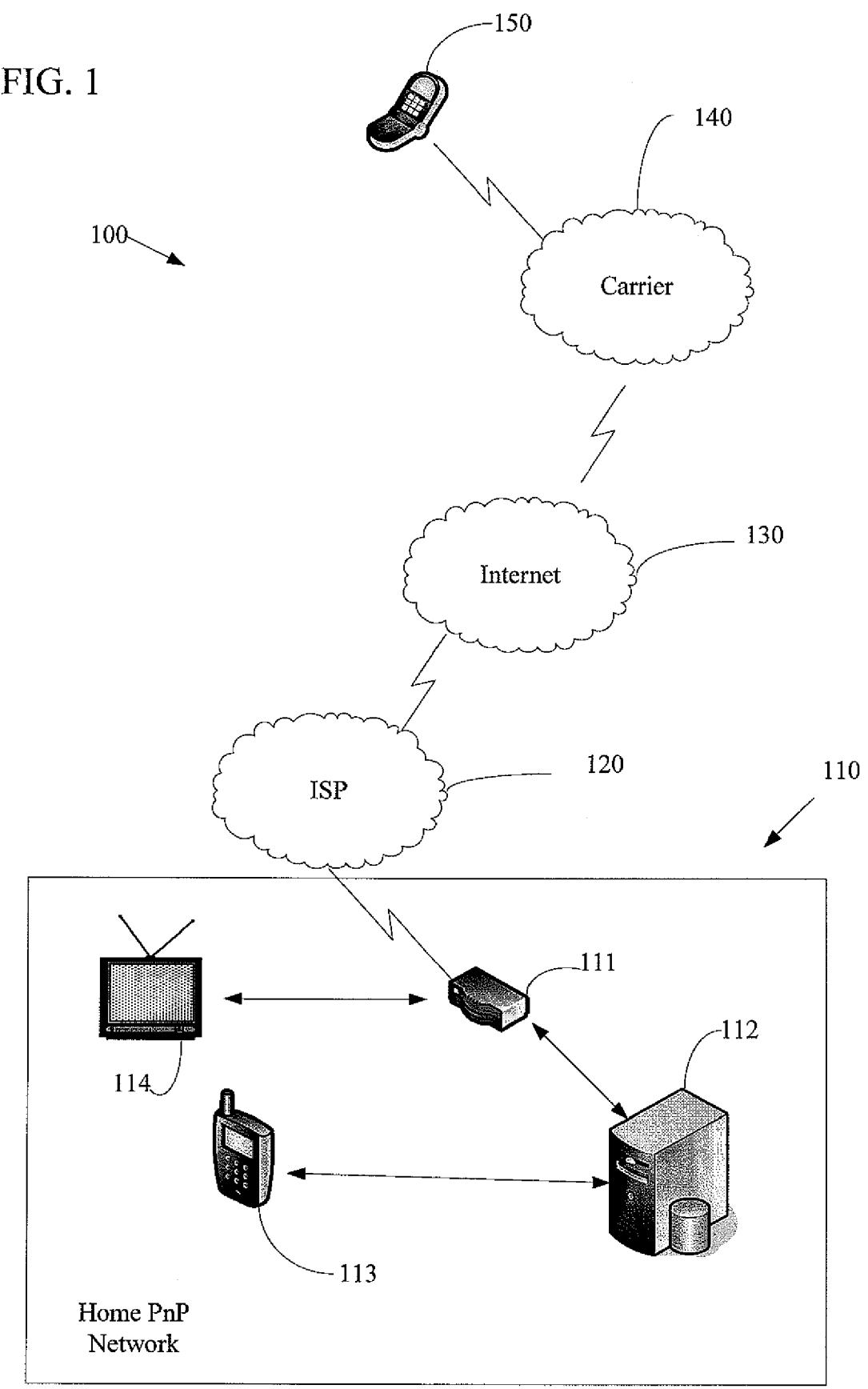
FIG. 1 illustrates an example Universal Plug and Play (UPnP) network.

The present disclosure is defined by the appended claims. This description summarizes some aspects of the present embodiments and should not be used to limit the claim.

While the present disclosure may be embodied in various forms, there are shown in the drawings and will hereinafter be described some exemplary and non-limiting embodiments, with the understanding that the present disclosure is to be considered an exemplification of the disclosure and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a and an" object is to denote also one of a possible plurality of such objects.

In a preferred embodiment, a latency and propagation delay compensation system is disclosed for a Universal Plug-and-Play network (UPnP) network. The delay compensation system assess network conditions either initially, continuously, or periodically to determine a round-trip latency and propagation delay period (LPDP) and adjusts the timing requirements on the remote UPnP device.

FIG. 1 illustrates an example data network 100 that may include one or more UPnP devices. The data network 100 includes a network that connects UPnP-enabled devices with each other. The underlying transport layer for the data network 100 may encompass different protocols and/or media. The data network 100 includes a home data network 110, one or more network connections (120, 130 and 140), and one or more UPnP-enabled portable devices 150 that access the network connections. The home data network 110 may include a home network gateway, such as a network router 111, a desktop personal computer 112, a wireless portable device 113, and an entertainment module 114. Other devices adapted to interface with the UPnP standard may be included in the home data network 110. The network connections (120, 130 and 140) may include an Internet Service Provider 120, an IP network, such as a public Internet connection 130, and a wireless carrier 140, such as a cellular carrier. The UPnP-enabled portable device 150 may comprise a wireless cellular telephone, a personal digital assistant (PDA), a smart phone, a wireless electronic device, a laptop computer, or other UPnP-enabled mobile electronic devices.

Figure 2:
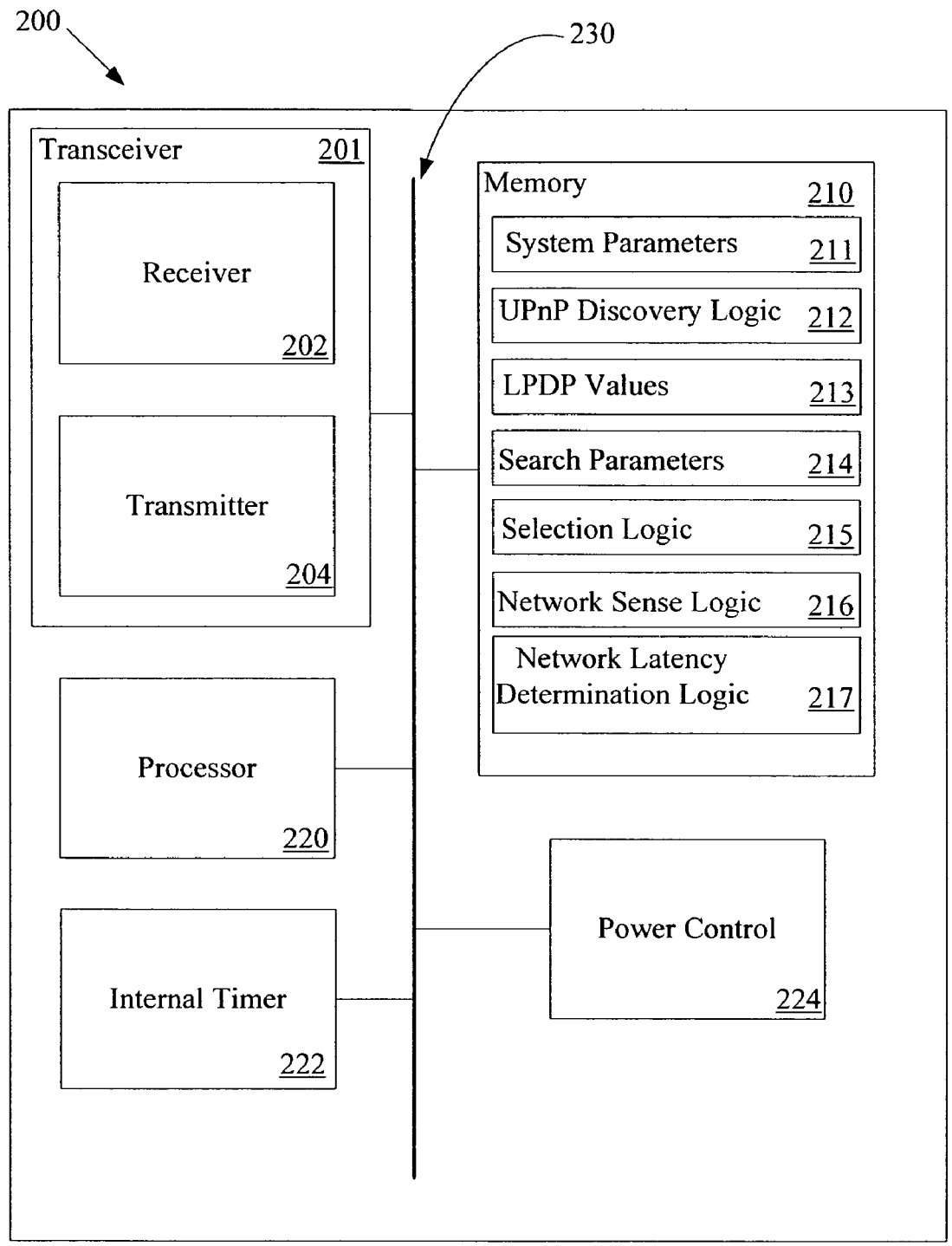
FIG. 2 illustrates an example UPnP device.

FIG. 2 illustrates an example UPnP device, such as a UPnP control point 200. The UPnP control point 200 includes a transceiver 201 that allows the UPnP control point 200 to communicate with the data network 100. The transceiver 201 includes a receiver 202 operable to receive data packets from the data network 100, and a transmitter 204 operable to transmit data packets to the data network 100. A system memory 210 is configured to retain instructions, parameters, or other data related to operations of the UPnP control point 200. A processor 220 is configured to execute instructions and process data that may be retained in the system memory 210 or stored in computer-readable media interfaced with the UPnP control point 200 locally or remotely. An internal timer 222 is configured to determine elapsed times related to packet transmissions and packet receipts over the data network 100 via the transceiver 201. A power control module 224 regulates power distributed and consumed within the UPnP control point 200. The elements of the UPnP control point 200 may communicate with each other over a system bus 230.

The system memory 210 may retain data related to system parameters 211; UPnP discovery logic 212 operable to initiate and process a discovery protocol for the UPnP control point 200; LPDP values 213 associated with network transport layer protocols; search parameters 214 associated with M-SEARCH commands and MX values for the Data network 100; selection logic 215 operable to select the fixed value of the LPDP based on the network transport layer protocol; network sense logic 216 operable to determine the network transport layer protocol; and network latency determination logic 217 operable to determine a network latency measure, such as the LPDP associated with a network transport layer.

Any of the logic may comprise series of instructions retained in the system memory 210. In other embodiments, the logic may comprise circuitry configured to execute instructions. The processor 220 may comprise a microprocessor, an embedded processor, a microcontroller, a field programmable gate array (FPGA), an application specific integrated circuit (ASIC), a network appliance, a network processor, a discrete circuit, and/or other semiconductor circuits. The system memory 210 may comprise volatile or nonvolatile memory including a dynamic random access memory (DRAM), an electrically eraseable programmable read-only memory (EEPROM), a flash memory, a static random access memory (SRAM), a magnetic random access memory (MRAM), a bubble memory, compact discs (CDs), digital versatile discs (DVDs), a hard drive, floppy disks, or other memory storage modules.

When a UPnP-enabled device, such as the portable UPnP device 150 is added to the data network 100, a UPnP discovery protocol allows that device to advertise its services to control points on the data network 100. Similarly, when a control point is added to the data network 100, the UPnP discovery protocol allows that control point to search for devices of interest on the network. The exchange in both cases is a discovery message containing data about the UPnP device 150 or one of its services, for example, its type, identifier, and a pointer to more detailed information.

In the discovery phase, the UPnP control point 200 multicasts a search command to discover other UPnP devices on the data network 100. Recipients of this M-SEARCH command are to respond within an amount of time specified by an MX parameter embedded in the M-SEARCH command. The UPnP standard states that the control point should wait at least the amount of time specified in the MX header for responses to arrive from devices. The wait for responses should be extended by additional time (a second or two) to allow for network propagation and processing delays. The standard does not specify what this "additional time" should be, beyond the vague "one or two second" requirement.

When UPnP discovery is conducted over uncongested LANs, the "additional wait time" may be negligible. IEEE 802.11b/g wireless LAN routers 111 (for example) used in many data networks 100 have peak speeds of 11 Mb/s and 54 Mb/s, respectively, all but guaranteeing timely receipt of M-SEARCH responses. However, when the data network 100 is congested, the response to the M-SEARCH command can be delayed by more than "a second or two." For example, congestion may occur if a UPnP control point issues an M-SEARCH command while other users on the LAN are conducting large file transfers, media streaming, or other bandwidth-intensive action. If the control point that issued the M-SEARCH command waits only "a second or two", the control point may stop listening before the response arrives and may have no knowledge of devices that properly responded within MX seconds.

This latency effect may occur when issuing M-SEARCH commands over a wide-area network (WAN), such over the network connections 120, 130 and 140. Although the UPnP standard was originally defined to be a local-area networking protocol, a UPnP device may remotely connect to the home network in different ways, such as by using a tunneling method (e.g., virtual private network-VPN). For example, extensions to the existing standard currently being considered will specify how a UPnP-enabled mobile phone 150 can connect to a user's home data network 110 over a wide area network.

Referring to FIG. 1, round-trip latency and propagation delay can accrue not only because of delays inherent to cellular protocols (e.g., GPRS) within the carrier 140, but also because of inherent delays in the Internet connection 130. Variations in these delays (i.e., jitter) can occur as well. More than "a second or two" delay can accrue over the WAN. When this happens, the remote control point device, such as the UPnP-enabled portable device 150, may stop listening for responses to its M-SEARCH command before the responses have time to arrive.

In an embodiment of the disclosure, a UPnP control point 200 is configured to wait a determined amount of time for M-SEARCH responses, depending on network conditions. As mentioned previously, the only requirement is that the control point waits for MX seconds for responses to its M-SEARCH request with an additional wait time of one or two seconds to account for network latencies. This additional wait time may be referred to as a latency and propagation delay period (LPDP).

It is not sufficient for the UPnP control point 200 to only increase the value of MX to compensate for network latency since devices have the option to wait between 0 and MX seconds before responding. For example, if MX=50 seconds and there is a network latency of 8 seconds, increasing MX to 58 would allow the responding device to wait for 58 seconds before replying. In this case, the UPnP control point 200 would not receive the response for 66 seconds after the responding device replies, or a total of 74 seconds after the initial search command is sent.

Figure 3:
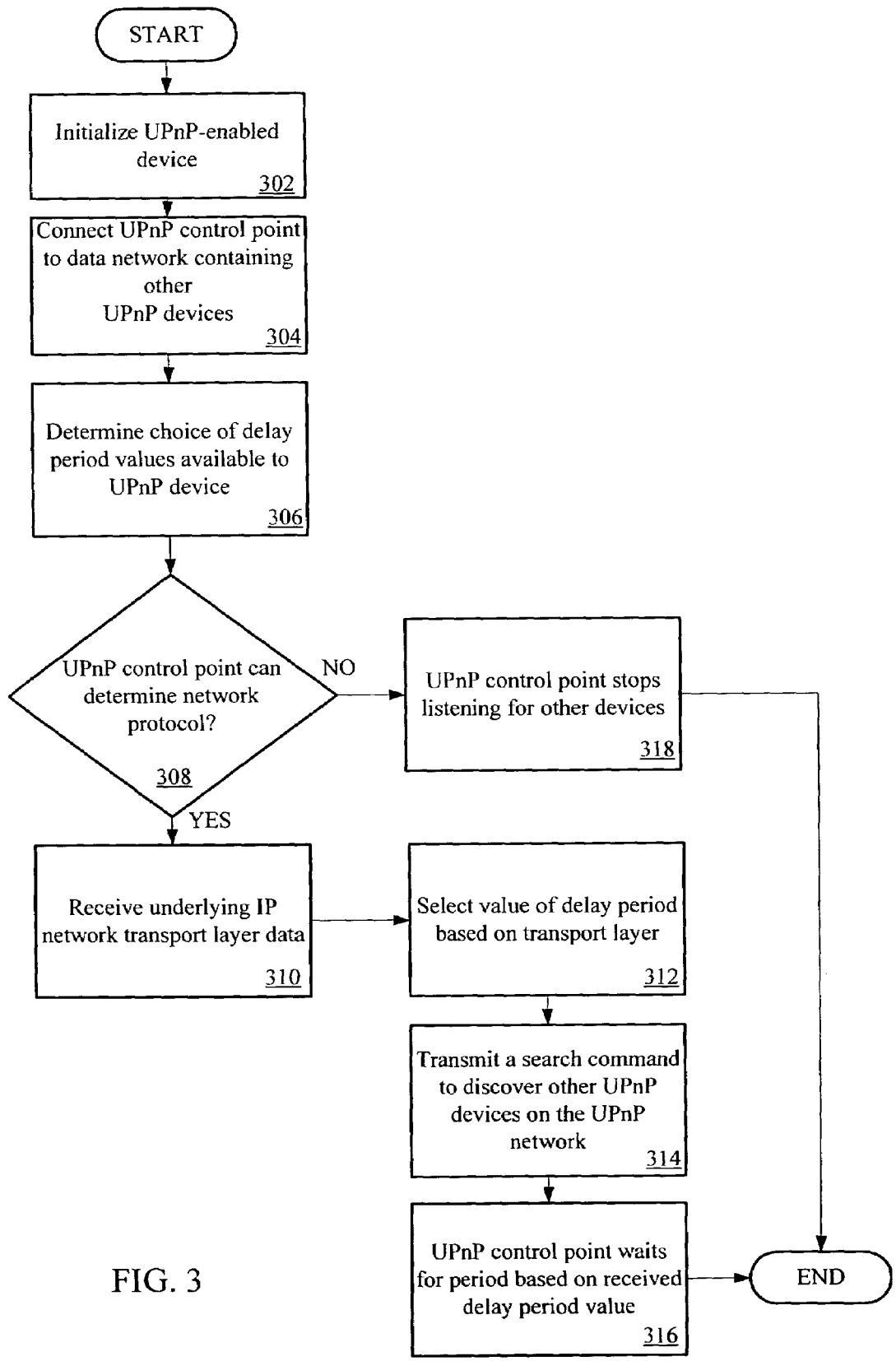
FIG. 3 is an example process for latency and delay compensation in a UPnP network.

In a preferred embodiment of the disclosure, the UPnP control point 200 transmits an M-SEARCH command with fixed values of LPDP based on the physical transport network. FIG. 3 illustrates an example process that compensates for latency in a UPnP network. Any of the elements of FIG. 2 may implement the steps of FIG. 3. The UPnP control point 200 may be initialized at start-up of the device, at step 302. The UPnP control point 200 may perform power-up checks on modules within the device, load parameters, data, and instructions for operation of the device, and/or other start-up actions. The UPnP control point 200 connects, at step 304, to a data network including other UPnP-enabled devices, such as the data network 100. The UPnP control point 200 may register, provide identification and security data, transmit data packets related to the device address or location, and/or other login actions. The UPnP control point 200 may discover other UPnP-enabled devices connected to the network 100 during the discovery period.

The UPnP control point 200 determines values for LPDP available to the UPnP control point 200 for different network transport layer protocols, at step 306. The UPnP control point 200 may access the system memory 210 to determine LPDP values 213. The UPnP control point 200 may determine, at step 308, whether the device 200 can determine the network transport layer protocol. The UPnP control point 200 may transmit data packets configured to determine network connectivity. If the UPnP control point 200 can determine a connection to the data network 100, the UPnP control point 200 receives underlying IP network transport layer data, at step 310. The UPnP control point 200 may use non-UPnP protocol methods to determine the underlying transport being used for data transmission, for example IEEE 802.11b/g WLAN, Bluetooth, or GPRS/UMTS. The UPnP control point 200 may use Application Programming Interfaces (APIs) that can provide this information. Once the UPnP control point 200 receives network transport layer data, the UPnP control point 200 selects an LPDP from among several predetermined, fixed values, at step 312. In an example embodiment, LPDP could be 1 second if the network is WiFi and 10 seconds if the network is GPRS.

The UPnP control point 200 then transmits a search command, at step 314, to other UPnP devices on the data network 100. The search command may be implemented as an M-SEARCH command formatted based on the UPnP standard. The M-SEARCH command may further include a UPnP header wait time, such as an MX value based on the UPnP standard. The UPnP control point 200 then waits a mandatory wait time period based on the delay period LPDP and the MX wait time, at step 316. The UPnP control point 200 preferably waits a mandatory wait time equal to a sum of the LPDP and the MX wait time before the control point 200 stops listening. If the UPnP control point 200 is unable to determine the network transport layer protocol, or does not receive network latency data, the UPnP control point 200 stops listening for other UPnP devices, at step 318.

Figure 4:
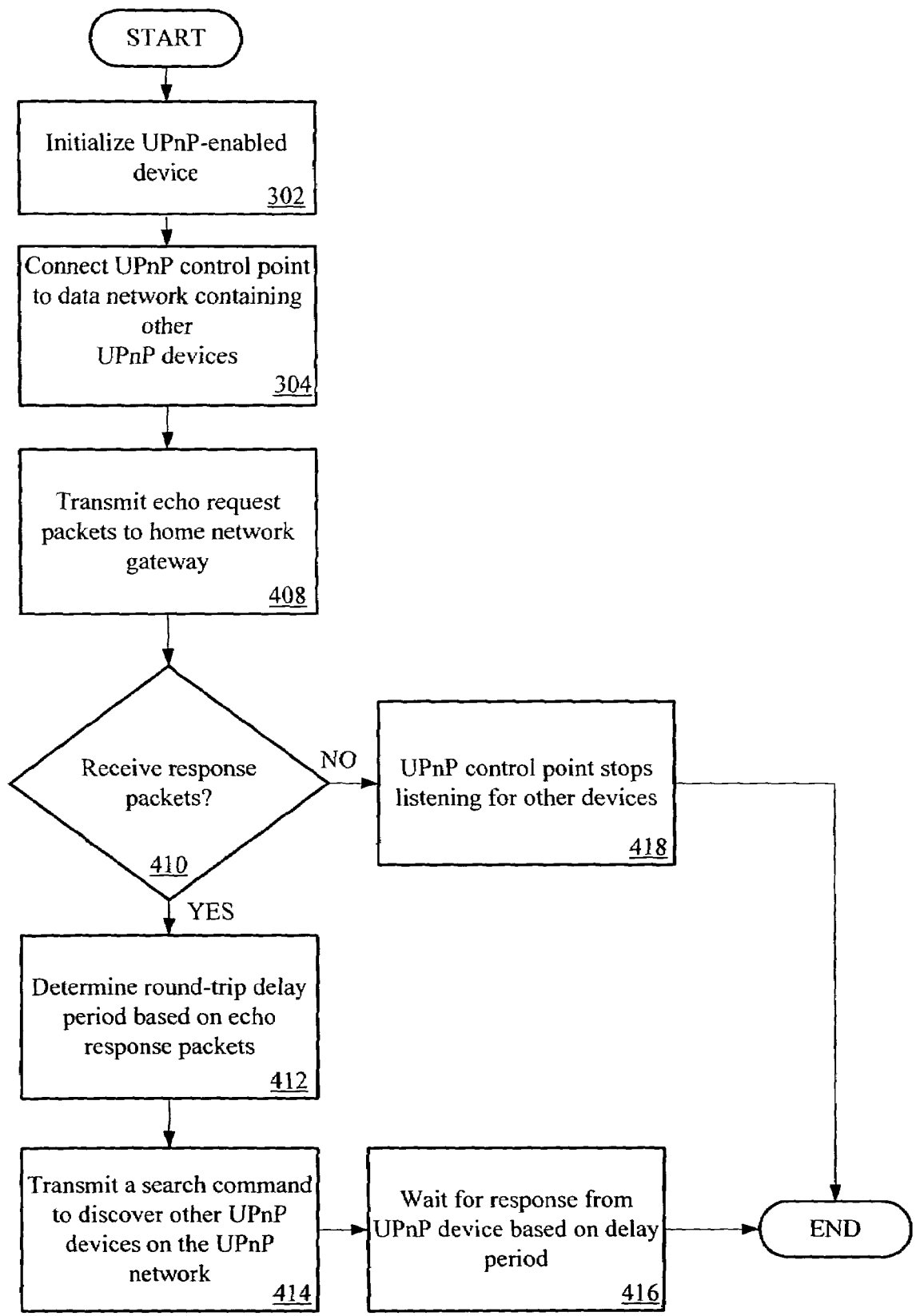
FIG. 4 is a second example process for latency and delay compensation in a UPnP network.

In another preferred embodiment, the UPnP control point 200 periodically assesses network latency conditions and adjusts the LPDP accordingly. FIG. 4 illustrates an example process that compensates for latency in a UPnP network. Any of the elements of FIG. 2 may implement the steps of FIG. 4. In one embodiment, the UPnP control point 200 transmits an echo request packet, at step 408, using an IP protocol such as PING to determine a round trip time between the UPnP control point 200 and the home network gateway router 111. PING is a computer network tool used to test whether a particular host is reachable across an IP network. PING works by sending ICMP "echo request" packets to the target host and listening for ICMP "echo response" packet replies.

The UPnP control point 200 determines, at step 410, whether an echo response packet has been received. Using interval timing and response rate, the UPnP control point 200 estimates the round-trip time (generally in milliseconds although the unit is often omitted) and packet loss (if any) rate between hosts, at step 412. The LPDP value can be set to this round-trip time. The PING process may accurately assess propagation delay between the UPnP control point 200 and the home network gateway router 111. The UPnP control point 200 determines the LPDP value based on the round-trip time, at step 412, and the UPnP control point 200 waits. Because devices inside the home network 110 may be subject to Network Address Translation (NAT), sending a PING message to individual devices may not be possible.

The UPnP control point 200 then transmits a search command, at step 414, to other UPnP devices on the Data network 100. The search command may be implemented as an M-SEARCH command formatted based on the UPnP standard. The M-SEARCH command may further include a wait time period header, such as an MX value based on the UPnP standard. The UPnP control point 200, then waits a mandatory wait time period based on the delay period LPDP value and the MX wait time, at step 416. The UPnP control point preferably waits a mandatory wait time equal to a sum of the LPDP and the MX wait time before the device stops listening. If the UPnP control point 200 does not receive echo response packets and is therefore unable to determine a round-trip time for the LPDP value, the UPnP control point 200 stops listening for other UPnP devices, at step 416. Alternatively, the UPnP control point 200 may select a determined LPDP value to use to determine the mandatory wait time.

Figure 5:
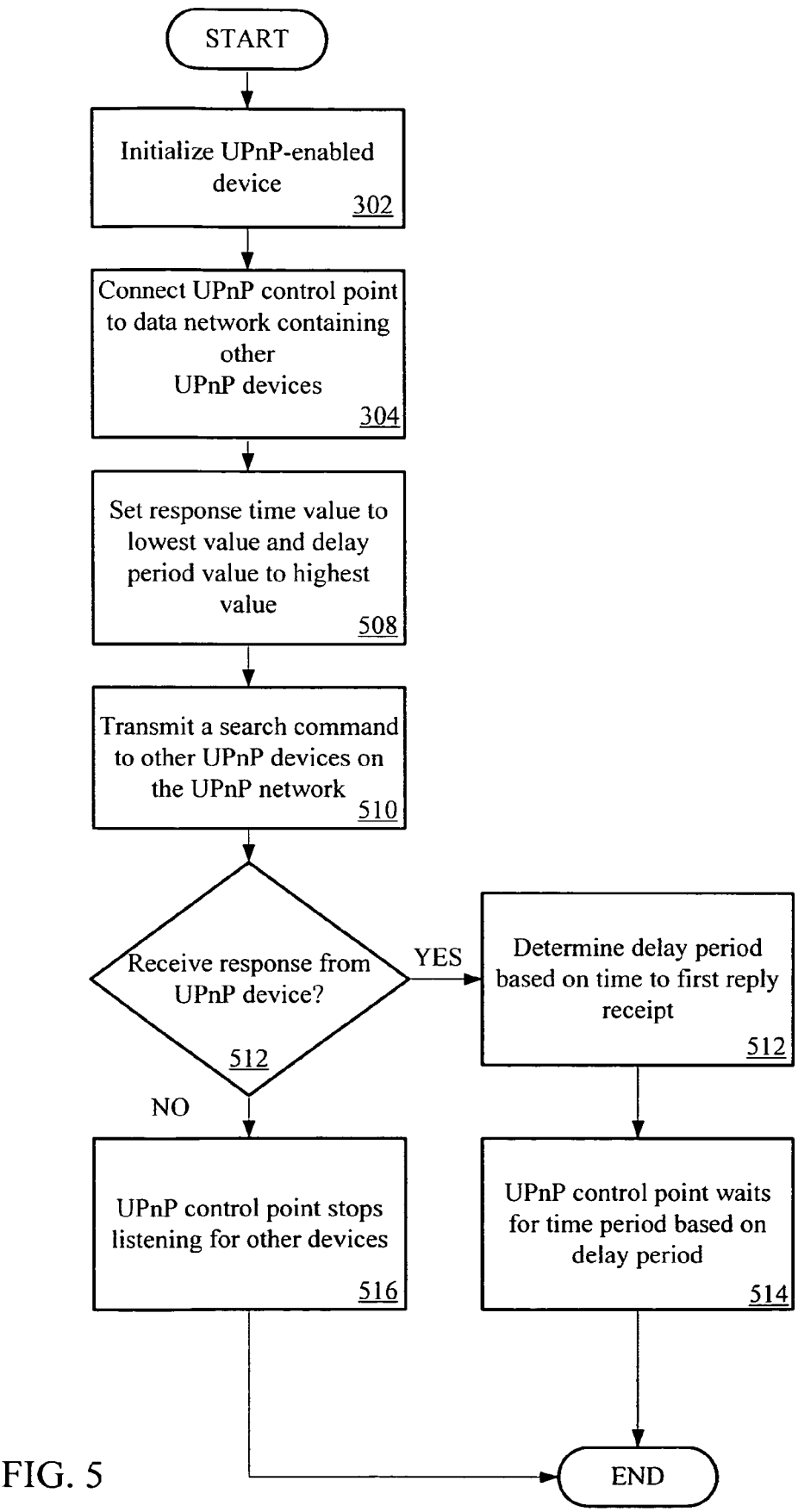
FIG. 5 is a third example process for latency and delay compensation in a UPnP network.

In another embodiment, the UPnP device 150 initially determines MX to a low value and the LPDP value to a high value. The LPDP value can then be estimated based on the time it takes to receive the first reply, i.e. the LPDP value is less than or equal to the time it takes to receive the first reply. LPDP may be adjusted each time a device search is performed. FIG. 5 illustrates an example process that compensates for network latency. Any of the elements of FIG. 2 can implement the steps in FIG. 5. The UPnP control point 200 sets a response time value to a lowest value and delay period value to a highest value, at step 508. The UPnP control point 200 may set the LPDP value to 10 seconds, for example, and sets a UPnP header wait time to a value of 1 second.

The UPnP control point 200 then transmits a search command, at step 510, to other UPnP devices on the data network 100. The search command may be implemented as an M-SEARCH command formatted based on the UPnP standard. The M-SEARCH command may further include a wait time period header, such as an MX value based on the UPnP standard. The UPnP control point 200 then determines, at step 512, if a response from other UPnP devices is received, such as from other UPnP devices in the data network 100. The network latency determination logic 217 determines the LPDP value based on a time period to receive the first reply to the search command, at block 514.

The UPnP control point 200 waits for a mandatory wait time based on the delay period, such as the LPDP value plus the MX value, at step 516. If a response from other UPnP devices is not received, the UPnP control point stops listening for other devices, at step 516.

In another embodiment, the UPnP device 150 uses an internal timer 222 to estimate network latency by measuring the average elapsed time between packet transmissions and receipts. The network latency determination logic 217 determines the LPDP value based on a function, such as an average value, of the elapsed times between the packet transmissions and the packet receipts. This may accurately assess propagation delay between the UPnP control point 200 and a targeted device (e.g., wireless electronic device 113) in the home that is behind the home data network gateway 111.

In another embodiment, the UPnP control point 200 receives data from the data network provider, such as the carrier 140, related to current network latency conditions. The network latency determination logic 217 determines delays in either the carrier 140 or the Internet 130, depending on the network provider, such as the carrier 140.

Figure 6:
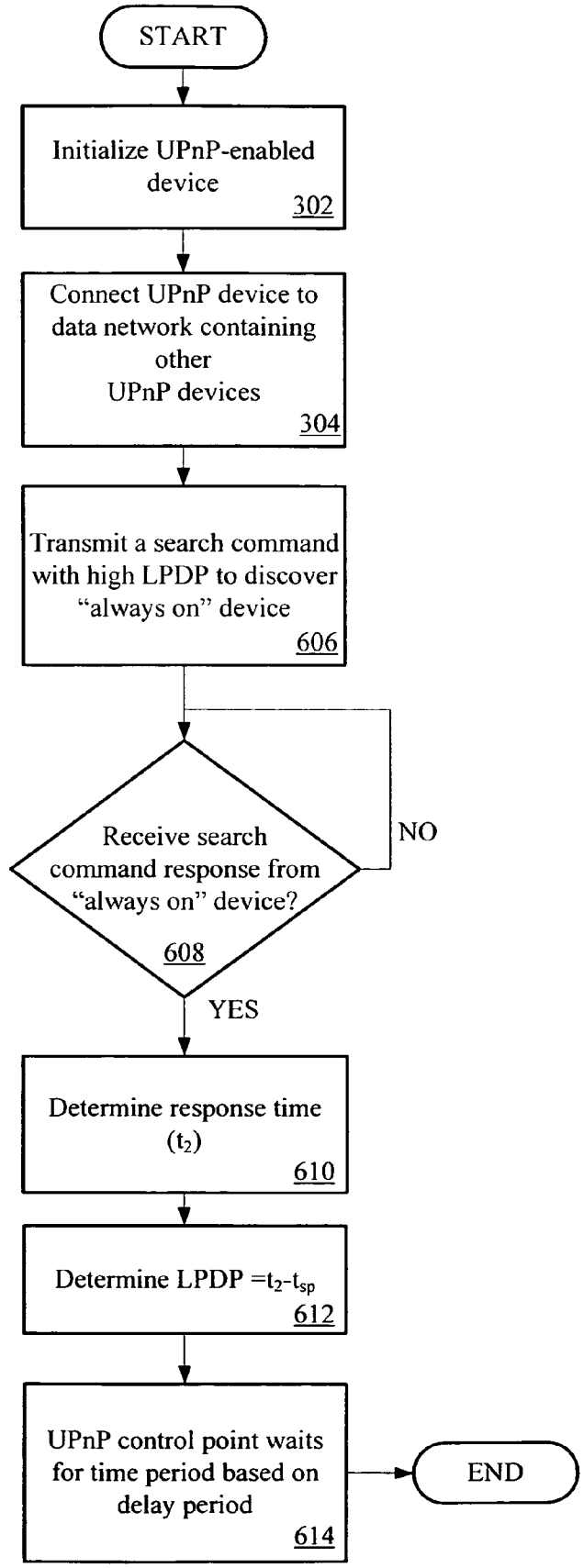
FIG. 6 is a fourth example process for latency and delay compensation in a UPnP network.

In another embodiment, a UPnP device on the home network 110, such as the wireless electronic device 113, is left in an "always on" state. The UPnP control point 200 knows a priori of the existence of the device. The "always on" device responds in a pre-specified amount of time, $t_{sp}$. In general, devices may respond between 0 and MX seconds. FIG. 6 illustrates an example process that compensates for network latency in a data network 100. The UPnP control point 200 transmits a search command, such as an M-SEARCH command, with a high LPDP value to discover the "always on" device on the UPnP network, at step 606. The UPnP control point 200 determines if it has received a response from the "always on" network device, at step 608. If the UPnP control point 200 receives a response from the "always on" network device, the UPnP control point 200 then determines a round-trip response time ($t_2$) for the "always on" UPnP device, at step 610, and determines the LPDP as $t_2-t_{sp}$ at step 612. The UPnP control point 200 may repeat this process periodically to assess network conditions. This may assess end-to-end (i.e., UPnP control point 200 to home device 113) delay. The UPnP control point 200 then waits for a mandatory wait time, at step 614, for time period based on the delay period, such as a sum of the determined LPDP and MX, for example.

In an alternative embodiment, the UPnP control point 200 may transmit a search command with a low value of LPDP (e.g., starting with LPDP=0). If the UPnP control point 200 does not receive a response, the UPnP control point 200 increases the LPDP value until it receives a response from the "always on" device.

The disclosed UPnP control point 200 makes it mandatory for a control point to wait a specific amount of time for M-SEARCH responses, depending on network conditions. As mentioned previously, the only current UPnP protocol requirement is that the control point wait for MX seconds for responses to its M-SEARCH request, with an additional wait time of one or two seconds to account for network latencies. Many UPnP control points do not wait any additional time beyond MX, relying instead on devices to respond in a period less than MX seconds. The disclosed UPnP control point 200 may compensate for network congestion and latency delays when connecting portable devices to a data network 100 outside of a home network 110.

The methods shown in FIGS. 3-6, the sequence diagrams may be encoded in a signal bearing medium, a computer readable medium such as a memory, programmed within a device such as one or more integrated circuits, or processed by a controller or a computer. If the methods are performed by software, the software may reside in a memory resident to or interfaced to the UPnP control point 200, a communication interface, or any other type of non-volatile or volatile memory interfaced or resident to the data network 100 or UPnP control point 200. The memory may include an ordered listing of executable instructions for implementing logical functions. A logical function may be implemented through digital circuitry, through source code, through analog circuitry, or through an analog source such as through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any module that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While the principles of the invention have been described above in connection with specific apparatus, it is to be clearly understood that this description is made only by way of example and not as a limitation on the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A universal plug and play (UPnP) network device, comprising:
   a memory operable to store a fixed value of a network latency and propagation delay period (LPDP) based on a network transport layer protocol associated with the UPnP network;
   a transceiver operable to transmit a UPnP search command;
   a processor configured to execute:
      network sense logic operable to determine the network transport layer protocol, the network sense logic stored in the memory; and
      selection logic operable to select the fixed value of the LPDP based on the determined network transport layer protocol, the selection logic stored in the memory;
   wherein the UPnP network device waits for the UPnP search command response for a mandatory wait time based on the selected fixed value of the LPDP.

2. The UPnP network device of claim 1, wherein the fixed value of the LPDP comprises a different value for different network transport layer protocols.

3. The UPnP device of claim 1, wherein the memory is further operable to store a wait time parameter, the mandatory wait time comprising a sum of the wait time parameter and the selected fixed value of the LPDP.

4. The UPnP device of claim 1, wherein the network sense logic comprises an application programming interface configured to determine the network transport layer protocol.

5. The UPnP device of claim 1, wherein the network sense logic comprises logic that uses a non-UPnP protocol process to determine the network transport layer protocol.

6. A universal plug-and-play (UPnP) network device, comprising:
   a transceiver;
   a memory operable to store a network latency and propagation delay period (LPDP) value, and a UPnP header wait time;
   a processor coupled with the memory and configured to:
      execute network latency determination logic stored in the memory operable to determine a network latency measure associated with a network transport layer; and
      execute instructions stored in the memory to adjust the LPDP value based on the network latency measure;
   wherein the UPnP device waits a mandatory wait time for a UPnP search command response based on the LPDP value.

7. The UPnP device of claim 6, wherein the network latency determination logic is further operable to continuously or periodically determine the network latency measure.

8. The UPnP device of claim 6, wherein the mandatory wait time comprises a sum of the UPnP header wait time and the LPDP value.

9. The UPnP device of claim 6, wherein the transceiver is operable to:
   transmit an echo request packet; and
   receive an echo response packet;
   wherein the processor is operable to determine the LPDP value based on a round-trip time based on an echo response packet timing measure.

10. The UPnP device of claim 9, wherein the echo request packet comprises a PING protocol command.

11. The UPnP device of claim 6, wherein the processor is operable to set the UPnP header wait time to an initial low value, and operable to set the LPDP value to an initial high value, and wherein the network latency determination logic is further operable to determine the LPDP value based on a time period to receive the UPnP search command response.

12. The UPnP device of claim 11, wherein the network latency determination logic determines the LPDP value to be less than or equal to the time period to receive the UPnP search command response.

13. The UPnP device of claim 12, wherein the network latency determination logic determines the LPDP value each time the UPnP search command is transmitted.

14. The UPnP device of claim 6, further comprising an internal timer configured to measure elapsed times between packet transmissions and packet receipts, wherein the network latency determination logic is further operable to determine the LPDP value based on a function of the elapsed times between the packet transmissions and the packet receipts.

15. The UPnP device of claim 14, wherein the function comprises an average of the elapsed times.

16. The UPnP device of claim 6, wherein the transceiver is operable to receive current network latency conditions from a data network provider, and wherein the network latency determination logic is operable to determine the LPDP based on the received current network latency conditions.

17. The UPnP device of claim 16, wherein the data network provider comprises at least one of a cellular data network provider or an IP network provider.

18. The UPnP device of claim 6, wherein the transceiver transmits a UPnP search command; and receives a UPnP search command response from an "always-on" network device within a determined "always-on" response time; and wherein the network latency determination logic is further operable to:
    determine an initial high LPDP value to transmit with the first UPnP search command; and
    determine the LPDP value to be a difference between a time to receive the UPnP search command response from the "always on" network device and the determined "always-on" response time.

19. The UPnP device of claim 18, wherein the network latency determination logic periodically determines the LPDP value.

20. A method for compensating for latency in a universal plug and play (UPnP) network, the method comprising:
    determining, by a UPnP control point having a processor and system memory, a fixed value of a network latency and propagation delay period (LPDP) based on a network transport layer protocol associated with the UPnP network;
    transmitting, by the UPnP control point, a UPnP search command;
    determining, by the processor, the network transport layer protocol;
    selecting, by the processor, the fixed value of the LPDP based on the determined network transport layer protocol; and
    waiting, by the UPnP control point, for the UPnP search command response for a mandatory wait time based on the selected fixed value of the LPDP.

21. The method of claim 20, where determining the network transport layer protocol comprises determining the network transport layer protocol with a non-UPnP-enabled process.

22. A method for compensating for latency in a universal plug and play (UPnP) network, the method comprising:
    determining, by a UPnP control point having a processor and system memory, a UPnP network latency measure associated with the UPnP network transport layer;
    adjusting, by the processor, a network latency and propagation delay period (LPDP) value based on the network latency measure;
    transmitting, by a transceiver of the UPnP control point, a UPnP search command; and
    waiting, by the UPnP control point, a mandatory wait time for a UPnP search command response based on the LPDP value.

* * * * *

UNITED STATES PATENT AND TRADEMARK OFFICE
CERTIFICATE OF CORRECTION

Page 1 of 1

PATENT NO.       : 7,821,955 B2
APPLICATION NO.  : 11/647503
DATED            : October 26, 2010
INVENTOR(S)      : James J. Morikuni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 869 days.

Signed and Sealed this
Twenty-second Day of February, 2011

David J. Kappos
*Director of the United States Patent and Trademark Office*